United States Patent

Keck et al.

[11] 3,896,141
[45] July 22, 1975

[54] 4-(4'-AMINO-3',5'-DICHLORO-PHENYL)-3-TERTIARY BUTYL-OXAZOLIDINES

[75] Inventors: Johannes Keck; Gunther Engelhardt, both of Biberach an der Riss, Germany

[73] Assignee: Boehringer Ingelheim GmbH, Ingelheim am Rhein, Germany

[22] Filed: Mar. 8, 1973

[21] Appl. No.: 339,389

[30] Foreign Application Priority Data
Mar. 18, 1972 Germany.............................. 2213271

[52] U.S. Cl.... 260/307 FA; 260/240 D; 260/296 R; 260/570.6; 424/263; 424/272
[51] Int. Cl............................................. C07d 85/26
[58] Field of Search....... 260/307 FA, 296 R, 240 D

[56] References Cited
OTHER PUBLICATIONS
Tachikawa et al., C.A. 73, 87946s (1970).

*Primary Examiner*—Donald G. Daus
*Assistant Examiner*—R. V. Rush
*Attorney, Agent, or Firm*—Hammond & Littell

[57] ABSTRACT

Compounds of the formula

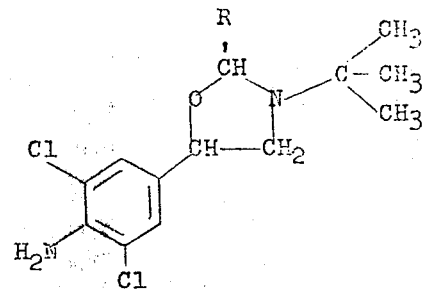

wherein
R is hydrogen, lower alkyl, lower alkenyl, aryl-lower alkenyl, aryl, heteroaryl, halo-aryl or halo-heteroaryl, and their non-toxic, pharmacologically acceptable acid addition salts; the compounds as well as their salts are useful as broncholytics.

4 Claims, No Drawings

4-(4'-AMINO-3',5'-DICHLORO-PHENYL)-3-TERTIARY BUTYL-OXAZOLIDINES

This invention relates to novel 5-(4'-amino-3',5'-dichloro-phenyl)-3-tert.butyl-oxazolidines and their non-toxic, pharmacologically acceptable acid addition salts, as well as to a process for preparing these compounds.

More particularly, the present invention relates to a novel class of compounds of the formula

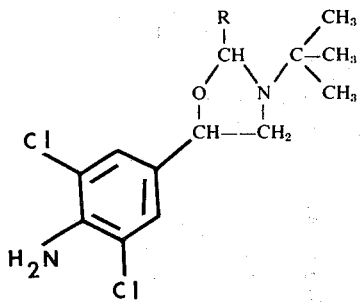

wherein

R is hydrogen, lower alkyl, lower alkenyl, aryllower alkenyl, aryl, heteroaryl, halo-aryl or halo-heteroaryl, and their non-toxic, pharmacologically acceptable acid addition salts.

The preferred embodiments of substituent R are hydrogen, methyl, ethyl, propyl, isopropyl, n-pentyl, phenyl, 2-chlorophenyl, pyridyl-(4) and styryl.

The compounds embraced by formula I may be prepared by reacting the compound of the formula

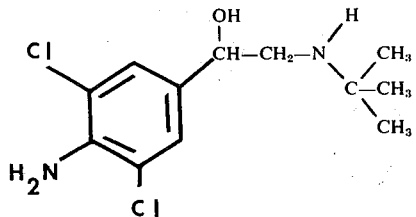

with an aldehyde of the formula

wherein R has the same meanings as in formula I. The reaction is advantageously carried out in a solvent, such as ethanol, benzene, toluene or dioxane, under dehydrating conditions, for example, in the presence of anhydrous copper(II) sulfate, at temperatures up to the boiling point of the solvent used, for example, at temperatures between 20°C and 100°C. The reaction may also be effected without a solvent; the most preferable way, however, to carry out this reaction is in a reaction vessel provided with a water separator funnel in the presence of a solvent, such as benzene or toluene.

The resulting racemate may, if desired, subsequently be separated into its optically active antipode components, for example, by fractional crystallization of its diastereomeric salt with an optically active acid.

The compounds of the formula I, in both the racemic and optically active form, may be converted into their non-toxic, pharmacologically acceptable acid addition salts in the conventional way. Acids suitable for non-toxic salt formation include, for example, inorganic mineral acids, such as hydrochloric acid, hydrobromic acid, sulfuric acid or phosphoric acid; and organic acids, such as lactic acid, citric acid, maleic acid, 8-chlorotheophylline or the like.

The starting compounds of the formulas II and III needed for the above-described process are known compounds.

The following examples further illustrate the present invention and will enable others skilled in the art to understand it more completely. It should be understood, however, that the invention is not limited solely to the particular examples given below.

EXAMPLE 1

5-(4'-Amino-3',5'-dichlorophenyl)-3-tert.butyl-oxazolidine and its hydrochloride 27.7 gm (0.1 mol) of 1-(4'-amino-3',5'-dichlorophenyl)-2-tert.butylamino-ethanol were refluxed in 200 ml of benzene with 10 gm (0.13 mol) of an aqueous 40% formaldehyde solution for 5 hours in a vessel provided with a water separator funnel. After 3 hours of refluxing, another 3 gm of said formaldehyde solution were added. The solution was then evaporated, and the residue was reprecipitated from petroleum ether. The base, which had a melting point of 63°–65°C, was dissolved in absolute ethanol, the solution was weakly acidified with ethanolic hydrochloric acid, and the hydrochloride of 5-(4'-amino-3',5'-dichlorophenyl)-3-tert.butyl-oxazolidine of the formula

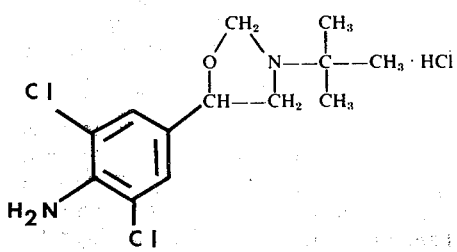

which melted at 183°–184°C (decomp.), was precipitated by the addition of ether.

EXAMPLE 2

5-(4'-Amino-3',5'-dichlorophenyl)-3-tert.butyl-2-methyl-oxazolidine and its hydrochloride 18.0 gm (0.065 mol) of 1-(4'-amino-3',5'-dichlorophenyl)-2-tert.butylamino-ethanol were refluxed in 100 ml of benzene with 4 gm (0.09 mol) of acetaldehyde for 30 hours in a vessel equipped with a water separator funnel. After 8 hours and again after 24 hours, an additional 4 gm of acetaldehyde were added. Then, the solution was evaporated, the residue was dissolved in absolute ethanol, and the resulting solution was weakly acidified with ethanolic hydrochloric acid. Ether was added to precipitate the hydrochloride of the formula

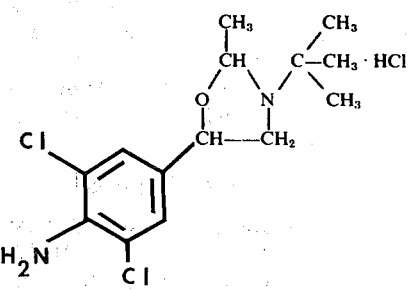

which melted at 178°–178.5°C (decomp.).

EXAMPLE 3

5-(4'-Amino-3',5'-dichlorophenyl)-3-tert.butyl-2-phenyl-oxazolidine 10.6 gm (0.1 mol) of benzaldehyde and 18.0 gm (0.065 mol) of 1-(4'-amino-3',5'-dichlorophenyl)-2-tert.butylamino-ethanol were refluxed in 100 ml of benzene for 30 hours in a vessel equipped with a water separator funnel. Then, the solution was partially evaporated and allowed to stand for some time at +5°C, whereby a small amount of unreacted starting compound precipitated out. The precipitate was vacuum-filtered, the filtrate was evaporated and the residue was dissolved in ethanol. 5-(4'-amino-3',5'-dichlorophenyl)-3-tert.butyl-2-phenyl-oxazolidine of the formula

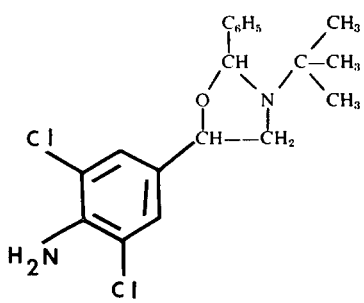

which melted at 92°–123°C, crystallized out in the form of a mixture of the two pairs of diasteroisomers.

EXAMPLE 4

Using a procedure analogous to that described in Example 1, 5-(4'-amino-3',5'-dichlorophenyl)-3-tert.butyl-2-ethyl-oxazolidine was prepared from 1-(4'-amino-3',5'-dichlorophenyl)-2-tert.butyl-amino-ethanol and propionaldehyde. The melting point of the hydrochloride was 176°–177.5°C (decomp.).

EXAMPLE 5

Using a procedure analogous to that described in Example 1, 5-(4'-amino-3',5'-dichlorophenyl)-3-tert.butyl-2-propyl-oxazolidine was prepared from 1-(4'-amino-3', 5'-dichlorophenyl)-2-tert.butyl-amino-ethanol and butyraldehyde. The melting point of the hydrochloride was 174°–175.5°C (decomp.).

EXAMPLE 6

Using a procedure analogous to that described in Example 1, 5-(4'-amino-3',5'-dichlorophenyl)-3-tert.butyl-2-isopropyl-oxazolidine was prepared from 1-(4'-amino-3',5'-dichlorophenyl)-2-tert.butyl-amino-ethanol and isobutyraldehyde. The melting point of the hydrochloride was 163°–166°C (decomp.).

EXAMPLE 7

Using a procedure analogous to that described in Example 1, 5-(4'-amino-3',5'-dichlorophenyl) 3-tert.butyl-2- n-pentyl-oxazolidine was prepared from 1-(4'-amino-3',5'-dichlorophenyl)-2-tert.butyl-amino-ethanol and caproaldehyde. The melting point of the hydrochloride was 154°–155°C.

EXAMPLE 8

Using a procedure analogous to that described in Example 3, 5-(4'-amino-3',5'-dichlorophenyl)-3-tert.butyl-2-pyridyl-(4'')-oxazolidine was prepared from 1-(4'-amino-3',5'-dichlorophenyl)-2tert.butyl-amino-ethanol and pyridine-4-aldehyde. The product had the formula

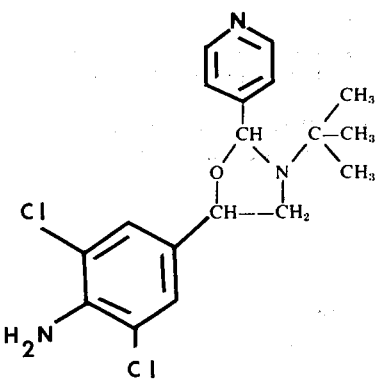

and melted at 136°–140°C.

EXAMPLE 9

Using a procedure analogous to that described in Example 1, 5-(4'-amino-3',5'-dichlorophenyl)-3-tert.butyl-2-(2''-chloro-phenyl)-oxazolidine was prepared from 1-(4'-amino-3',5'-dichlorophenyl)-2-tert.butyl-amino-ethanol and 2-chloro-benzaldehyde. The compound was precipitated in the form of its hydrochloride of the formula

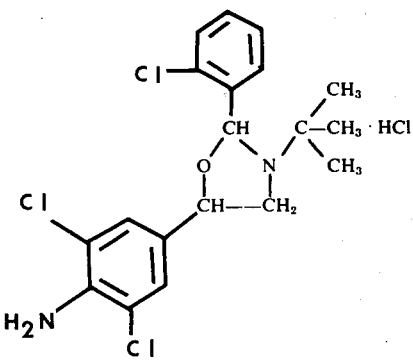

which melted at 178°–179.5°C (decomp.).

EXAMPLE 10

Using a procedure analogous to that described in Example 1, 5-(4'-amino-3',5'-dichlorophenyl)-3-tert.butyl-2-styryl-oxazolidine was prepared from 1-(4'-amino-3',5'-dichlorophenyl)-2-tert.butyl-amino-ethanol and cinnamaldehyde. The compound was precipitated in the form of its hydrochloride of the formula

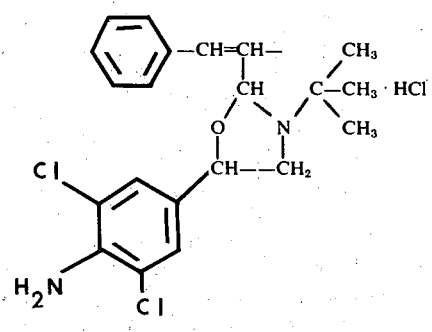

which melted at 172°–174°C (decomp.).

The compounds according to the present invention, that is, those embraced by formula I above and their nontoxic, pharmacologically acceptable acid addition salts have useful pharmacodynamic properties. More particularly, the compounds of the instant invention exhibit broncholytic activity in warm-blooded animals, such as guinea pigs.

The broncholytic activity of the compounds of the present invention was ascertained by the standard test method of Konzett-Rössler, Arch. exp. Path. Pharmakol. 195, 71 (1940), on anesthetized guinea pigs.

Bronchial spasms were artificially induced in the test animals by intravenous administration of 20 γ/kg of acetylcholine, the test compound under investigation was administered intravenously, and the percentage decrease in the bronchial spasms was recorded. The test was repeated at varying dosage levels of the test compound, the averaged values were plotted on a dose-activity graph, and the median effective broncholytic dose ($ED_{50}$), i.e. the dose which reduces the bronchial spasms by 50 %, was graphically determined.

The acute toxicity of the compounds being tested was determined or groups of 10 mice each. The $LD_{50}$, i.e. the dose which causes the death of 50% of the animals within 7 days, was graphically calculated according to the method of Litchfield and Wilcoxon.

Illustrative results of these tests, as determined for the following compounds:

A = 5-(4'-amino-3',5'-dichloro-phenyl)-3-tert.butyl-oxazolidine hydrochloride,
B = 5-(4'-amino-3',5'-dichloro-phenyl)-3-tert.butyl-2-methyl-oxazolidine hydrochloride,
C = 5-(4'-amino-3',5'-dichloro-phenyl)-3-tert.butyl-2-ethyl-oxazolidine hydrochloride,
D = 5-(4'-amino-3',5'-dichloro-phenyl)-3-tert.butyl-2-propyl-oxazolidine hydrochloride,
E = 5-(4'-amino-3',5'-dichloro-phenyl)-3-tert.butyl-2-iso-propyl-oxazolidine hydrochloride,
F = 5-(4'-amino-3',5'-dichloro-phenyl)-3-tert.butyl-2-styryl-oxazolidine hydrochloride and
G = 5-(4'-amino-3',5'-dichloro-phenyl)-3-tert.butyl-2-n-pentyl-oxazolidine hydrochloride, are shown in the following table.

TABLE

| Substance | $ED_{50}$ γ/kg i.v. | duration of activity in minutes | $LD_{50}$ mgm/kg i.v. |
|---|---|---|---|
| A | 6.4 | >120 | 30.0 |
| B | 5.5 | >120 | 39.8 |
| C | 7.2 | >120 | — |
| D | 11.5 | >120 | — |
| E | 5.4 | >120 | 35.9 |
| F | 26.0 | >120 | — |
| G | 13.5 | >120 | — |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories, and the like. One effective dosage unit of the compounds according to the present invention is from 0.167 to 1.67 γ/kg body weight, preferably 0.417 to 0.833 γ/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 11

Tablets

The tablet composition was compounded from the following ingredients:

| | |
|---|---|
| 5-(4'-amino-3',5'-dichlorophenyl)-3-tert.butyl-oxazolidine hydrochloride | 0.05 parts |
| Lactose | 82.45 parts |
| Potato starch | 33.00 parts |
| Polyvinylpyrrolidone | 4.00 parts |
| Magnesium stearate | 0.50 parts |
| Total | 120.00 parts |

Preparation:

The active ingredient and polyvinylpyrrolidone were dissolved in ethanol. The mixture of the lactose and the potato starch was homogeneously moistened with the active ingredient/granulation solution and passed through a screen of 1.5 mm mesh-size. Subsequently, the mixture was dried at 50°C and again passed through a screen of 1.0 mm meshsize. The granulate thus obtained was admixed with the magnesium stearate and compressed into 120 mgm-tablets. Each tablet contained 0.05 mgm of the oxazolidine compound and was an oral dosage unit composition with effective broncholytic activity.

EXAMPLE 12

Coated tablets

The tablet core composition was compounded from the following ingredients:

| | |
|---|---|
| 5-(4'-amino-3'',5'-dichlorophenyl)-3-tert.butyl-oxazolidine hydrochloride | 0.025 parts |
| Lactose | 82.475 parts |
| Potato starch | 33.000 parts |
| Polyvinylpyrrolidone | 4.000 parts |
| Magnesium stearate | 0.500 parts |
| Total | 120.000 parts |

Preparation:

Using a procedure analogous to that described in Example 11, tablet cores weighing 120 mgm each were prepared. The tablet cores were coated in known manner with a thin shell consisting essentially of a mixture of sugar and talcum and then polished with beeswax. Each coated tablet contained 0.025 mgm of the oxazolidine compound, and was an oral dosage unit composition with effective broncholytic activity.

EXAMPLE 13

Gelatin capsules

The capsule filler composition was compounded from the following ingredients:

| | |
|---|---|
| 5-(4'-amino-3',5'-dichlorophenyl)-3-tert.butyl-oxazolidine hydrochloride | 0.025 parts |
| Lactose | 59.975 parts |
| Corn starch | 60.000 parts |
| Total | 120.000 parts |

Preparation:

The active ingredient was intimately admixed with the lactose and the corn starch, and 120 mgm-portions

7 of the mixture were filled into gelatin capsules of suitable size. Each gelatin capsule contained 0.025 mgm of the oxazolidine compound, and was an oral dosage unit composition with effective broncholytic activity.

EXAMPLE 14

Hypodermic solution

The solution was compounded from the following ingredients:

| | | |
|---|---|---|
| 5-(4'-amino-3',5'-dichlorophenyl)-3-tert.butyl-oxazolidine hydrochloride | | 0.02 parts |
| Citric acid | | 2.50 parts |
| Sodium hydrogen phosphate | | 7.50 parts |
| Sodium chloride | | 4.60 parts |
| Distilled water | q.s.ad | 2000.00 parts by vol. |

Preparation:

The active ingredient, the buffer substances and the sodium chloride were dissolved in the distilled water, and the solution was filtered until free from suspended matter. The filtrate was filled into brown 2 ml-ampules in a protective nitrogen atmosphere, and the filled ampules were sterilized for 20 minutes at 120°C. Each ampule contained 0.02 mgm of the oxazolidine and its contents were an injectable dosage unit composition with effective broncholytic activity.

EXAMPLE 15

Suppositories

The suppository composition was compounded from the following ingredients:

| | |
|---|---|
| 5-(4'-amino-3',5'-dichlorophenyl)-3-tert.butyl-oxazolidine hydrochloride | 0.05 parts |
| Suppository base (e.g. cocoa butter) | 1669.95 parts |
| Total | 1700.00 parts |

Preparation:

The active ingredient was finely powdered and stirred into the suppository base, which had been melted and cooled to 40°C, using an immersion homogenizer. 1700 mgm-portions of the mixture at 37°C were poured into cooled suppository molds and allowed to harden therein. Each suppository contained 0.05 mgm of the oxazolidine compound and was a rectal dosage unit composition with effective broncholytic activity.

EXAMPLE 16

Syrup

The syrup was compounded from the following ingredients:

| | | |
|---|---|---|
| 5-(4'-amino-3',5'-dichlorophenyl)-3-tert.butyl-oxazolidine hydrochloride | | 0.0005 parts |
| Benzoic acid | | 0.1000 parts |
| Tartaric acid | | 1.0000 parts |
| Sugar | | 50.0000 parts |
| Flavoring | | 1.0000 parts |
| Food coloring | | 0.0500 parts |
| Distilled water | q.s.ad | 100.0000 parts by vol. |

8

Preparation:

The benzoic acid, the tartaric acid, the active ingredient, the food coloring and the sugar were successively dissolved in about 60% of the required amount of distilled water which had been heated to 80°C. After cooling to room temperature, the flavoring was added to the solution, and the composition was diluted with distilled water to the indicated volume and then filtered. Each 5 ml of the resulting syrup contained 0.025 mgm of the oxazolidine compound and was an oral dosage unit composition with effective broncholytic activity.

Analogous results are obtained when any one of the other oxazolidines embraced by formula I, or a non-toxic, pharmacologically acceptable acid addition salt thereof is substituted for the particular oxazolidine in Examples 11 to 16. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

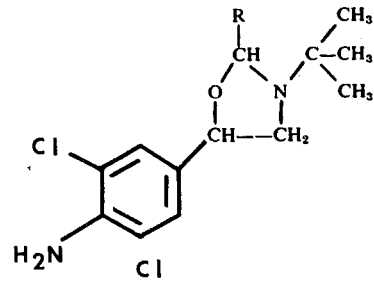

wherein
R is hydrogen, methyl, ethyl, propyl, isopropyl, n-pentyl, phenyl, 2-chlorophenyl, pyridyl-(4) or styryl,
or a non-toxic, pharmacologically acceptable acid addition salt thereof.

2. A compound of claim 1, which is 5-(4'-amino-3',5'-dichlorophenyl)-3-tert.butyl-oxazolidine or a non-toxic, pharmacologically acceptable acid addition salt thereof.

3. A compound of claim 1, which is 5-(4'-amino-3',5'-dichlorophenyl)-3-tert.butyl-2-methyl-oxazolidine or a non-toxic, pharmacologically acceptable acid addition salt thereof.

4. A compound of claim 1, which is 5-(4'-amino-3',5'-dichlorophenyl)-3-tert,butyl-2-isopropyl-oxazolidine or a non-toxic, pharmacologically acceptable acid addition salt thereof.

* * * * *